May 5, 1970
J. M. WENTZELL
3,510,546
METHODS FOR POWDERING METALS
Filed Dec. 15, 1967
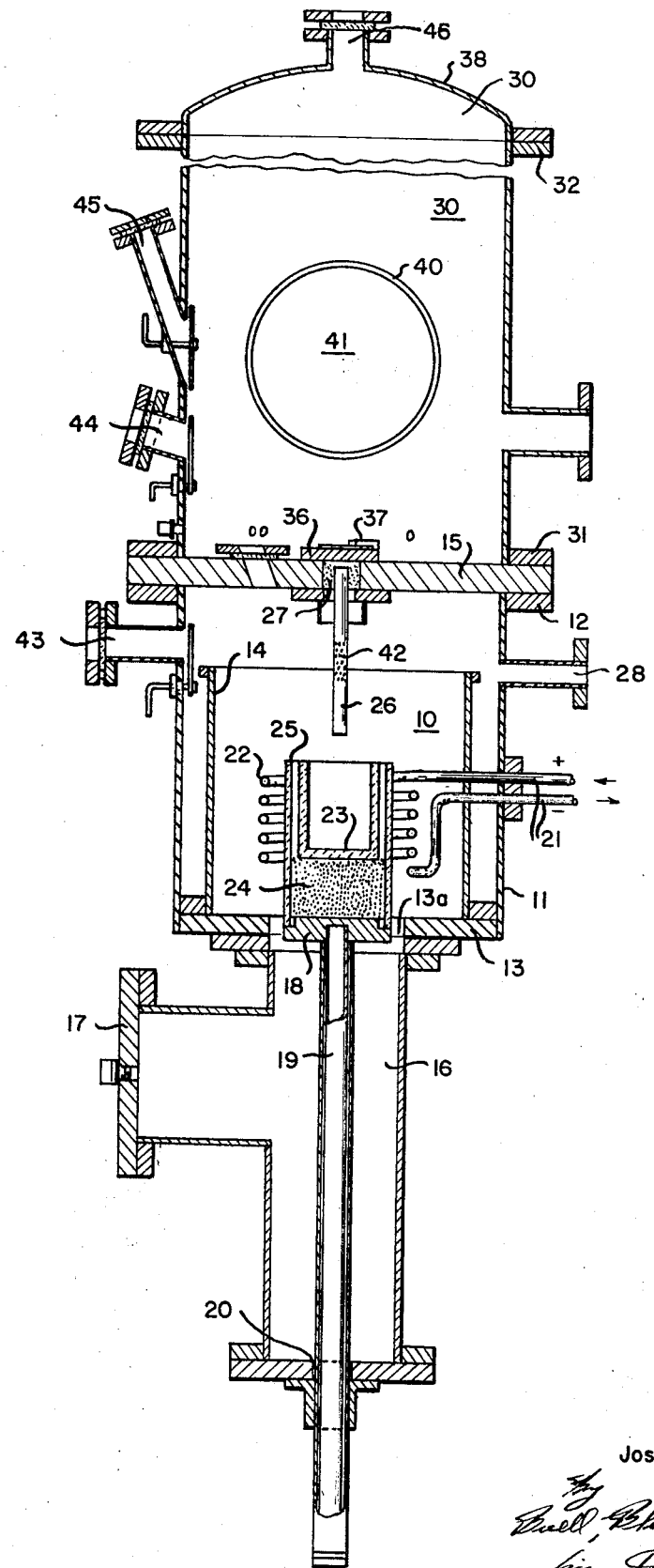
INVENTOR
Joseph M. Wentzell

United States Patent Office 3,510,546
Patented May 5, 1970

3,510,546
METHODS FOR POWDERING METALS
Joseph M. Wentzell, Oneida County, N.Y., assignor to Homogeneous Metals Inc.
Filed Dec. 15, 1967, Ser. No. 691,052
Int. Cl. B01j 2/04
U.S. Cl. 264—13
4 Claims

ABSTRACT OF THE DISCLOSURE

A method for forming metal powders by pressurizing molten metal with a compatible non-reactive gas or metal having a vapor pressure substantially above that of the metal, then spraying the pressurized metal through an orifice into a vacuum chamber where the formed metal particles are cooled and collected.

---

This invention relates to methods for powdering metals and particularly to a method of processing metals to provide high purity, generally uniform metal particles of exceptional quality.

The use of metal powders in forming solid articles of complex shape is well known. It has long been recognized that the quality of such articles and the intricacy of detail to be obtained is in large measure determined by the quality of the starting metal powders. Many methods of making metal powders have been proposed and used with some degree of success. In every case, however, the method is intricate, expensive and difficult to control so as to provide uniform high quality powdered metals.

I have invented a method for making metal powders which is relatively simple and easy to control and which provides a uniformly high quality powdered metal satisfactory for the powder metallurgy art.

Preferably, I form metal powders by saturating a molten metal bath with a gas substantially non-reactive with the metal, spray the molten metal into discrete particles by introducing the gas saturated molten metal under pressure through an orifice into a reduced pressure receiving chamber while simultaneously percolating non-reactive gas into the molten metal passing through the orifice, cooling the discrete particles in the spray and collecting the cooled particles as a powdered metal product. Preferably, I carry out the method with an apparatus consisting of a melting chamber having a container for molten metal and means for heating the same, means for controlling the gas pressure into said melting chamber, a vacuum receiving chamber superimposed on said melting chamber, an orifice tube connecting the container for molten metal and the vacuum receiving chamber, closure means on said orifice and means for percolating gas into the orifice.

Preferably, the metal container is a refractory crucible provided with induction heating means. The means for percolating gas into the orifice is preferably a porous transfer tube between the melting receiving chamber and the vacuum chamber.

In the foregoing general statement, I have set out certain purposes, and advantages. Other purposes and advantages will be apparent from a consideration of the following description and the accompanying drawing in which I have illustrated a melting chamber 10 formed by a cylindrical wall 11 having a top flange 12 and a bottom plate 13. An inner protective shell 14 is removably attached to bottom plate 13. The melting chamber is closed at the top by a plate 15. Plate 13 is provided with an opening 13a in the bottom, through which access is had to a charging chamber 16 connected to plate 13. The charging chamber is provided with an access door 17 and a vertically movable crucible holder 18 mounted on a shaft 19 sealingly slidable in opening 20 in the bottom of chamber 16. Induction lead-ins 21 are fixed through the outer wall 11 of the melting chamber and connect with induction coil 22 located centrally of the melting chamber. A crucible 23 is preferably supported on a base of refractory sand 24 held within a retainer ring 25 on holder 18. A transfer tube 26 is removably and sealingly held in opening 27 in plate 15. A vacuum and pressure lead 28 is connected to sidewall 11 to permit evacuation or pressurization of the melting chamber.

A vacuum receiving chamber 30 in the form of a cylinder having end flanges 31 and 32 is provided above the melting chamber and is connected to plate 15 by one of said flanges 31. The end of transfer tube 26 extends into the chamber 30 and closed by a spring loaded trap door 36 held by a latch 37. The chamber 30 is closed by head 38 fixed to flange 32.

The operation of the invention is as follows. A charge of metal to be powdered is placed in the crucible 23 and the crucible is placed on sand base 24 through access door 17. The crucible and metal is raised to the melting chamber by elevator shaft 19 until the crucible is within coil 22 where the metal is melted by the induction coil and the melting chamber evacuated by means of lead 28. When the charge is molten, the melting chamber is pressurized with a desired gas such as hydrogen which is absorbed by the melt. The trap door 36 is released by reasing latch 37. The charge sprays through transfer tube 26 into the vacuum receiving chamber 30 which is maintained under vacuum. The metal, particularly where soluble gas is used, virtually explodes in the vaccum chamber providing a finely divided powder which is cooled in the suspended state and collected in the vacuum chamber.

An access port 40 is preferably provided on top of the upper chamber and is closed by a plate 41, sealingly attached thereto.

Preferably, the transfer-tube is provided with fine holes or pores 42 through which gas is percolated as the metal rises. This promotes the explosive effect of the gas on the metal in the vacuum receiving chamber.

Sight tubes 43, 44, 45 and 46 are provided in the melting and vacuum receiving chambers as shown.

The operation of the method of the invention will perhaps be best illustrated by reference to the following example:

EXAMPLE

A crucible 23 containing pieces of Astroloy metal was placed in the melting chamber within heating coil 22. The melting chamber was evacuated and the metal heated until molten. Approximately ninety-five minutes later, hydrogen was introduced into the melting chamber over a period of thirty minutes. At the same time, the power was raised from 18 kw. to 24 kw. to compensate for the cooling effect of the hydrogen. The temperature of the molten bath was held at 2400° F. (optical). The pressure of the melting chamber was held at 45 p.s.i.g. for five minutes at the end of the pressurizing period to assure diffusion of hydrogen in the molten metal. The crucible was raised by elevator shaft 19 until the transfer tube 26 approached the bottom of the crucible and the trap door 36 was released. The saturated metal was injected through tube 26 into chamber 30 held at 14 microns pressure.

The screen analysis of the resultant spherical powder was:

| Screen size: | Percent |
|---|---|
| −20 +40 | 29 |
| −20 +80 | 43 |
| −80 +100 | 9.7 |
| −100 +200 | 11.8 |
| <200 | 7.2 |

While I prefer to use gases which are soluble in the molten metal in order to get the greatest efficiency, I have found that a solid gas reaction in the metal such as:

$$C + \tfrac{1}{2} O_2 \rightarrow CO$$

will give a similar result. It is also possible to use non-reactive relatively insoluble gases such as argon in my invention; however, the explosive effect is much reduced and the yields of satisfactory powder are lower. It is also possible to use a high vapor pressure material such as zinc to cause the explosive effect in a lower vapor pressure metal. However, the choice of such a metal activating medium is one that must be compatible with the end product desired.

While I have illustrated and described certain preferred practices and embodiments of my invention in the foregoing specification, it will be understood that this invention may be otherwise embodied within the scope of the following claims.

I claim:
1. A method for forming powdered metal, comprising:
    (a) melting said metal within a closed chamber,
    (b) adding to said molten metal an additive metal compatible with said powdered metal and having a vapor pressure substantially higher than that of said metal to be powdered, wherein said additive metal serves to pressurize said chamber and said molten metal therein,
    (c) permitting said pressurized metal to flow through an orifice into a second closed chamber of reduced pressure, and thereby spray said molten metal into discrete particles within said second chamber, and
    (d) cooling and collecting said formed particles as said powdered metal.
2. A method of forming powdered metal, comprising:
    (a) evacuating gases within a first closed chamber surrounding a container of molten metal,
    (b) pressuring said chamber with a non-reactive gas having a vapor pressure substantially higher than that of said metal to absorb said gas into said metal melt,
    (c) permitting said pressurized molten metal to flow through an orifice into a second closed chamber of reduced pressure and thereby spray the melt into discrete particles within said second chamber, and
    (d) cooling and collecting said formed particles as said powdered metal.
3. A method as claimed in claim 2 wherein said non-reactive gas is percolated into the molten metal passing through the orifice.
4. A method as claimed in claim 2 wherein said gas is hydrogen.

References Cited

UNITED STATES PATENTS 2,701,775   2/1955   Brennan _____ 264—13

FOREIGN PATENTS 532,700   11/1956   Canada.

ROBERT F. WHITE, Primary Examiner

J. R. HALL, Assistant Examiner